US009806535B2

(12) United States Patent
Nakashima et al.

(10) Patent No.: US 9,806,535 B2
(45) Date of Patent: Oct. 31, 2017

(54) POWER-RECEIVING DEVICE AND POWER TRANSMISSION SYSTEM

(71) Applicant: KABUSHIKI KAISHA TOYOTA JIDOSHOKKI, Kariya-shi, Aichi-ken (JP)

(72) Inventors: Yutaka Nakashima, Kariya (JP); Tsuyoshi Koike, Kariya (JP); Yuichi Taguchi, Kariya (JP); Hiroki Togano, Kariya (JP); Keisuke Matsukura, Kariya (JP); Takuma Ono, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 367 days.

(21) Appl. No.: 14/413,263

(22) PCT Filed: Jul. 4, 2013

(86) PCT No.: PCT/JP2013/068436
§ 371 (c)(1),
(2) Date: Jan. 7, 2015

(87) PCT Pub. No.: WO2014/010518
PCT Pub. Date: Jan. 16, 2014

(65) Prior Publication Data
US 2015/0200547 A1    Jul. 16, 2015

(30) Foreign Application Priority Data

Jul. 11, 2012   (JP) .................................. 2012-155643

(51) Int. Cl.
  *B60L 11/18*   (2006.01)
  *H02J 17/00*   (2006.01)
  (Continued)

(52) U.S. Cl.
  CPC ............ *H02J 5/005* (2013.01); *B60L 11/182* (2013.01); *B60L 11/1811* (2013.01);
  (Continued)

(58) Field of Classification Search
  USPC ........................................................ 307/104
  See application file for complete search history.

(56) References Cited

U.S. PATENT DOCUMENTS

2009/0200870 A1    8/2009   Uno et al.
2012/0043807 A1*   2/2012   Ichikawa ............ B60L 11/1816
                                                  307/9.1

(Continued)

FOREIGN PATENT DOCUMENTS

DE    102010055925 A1   6/2012
JP       10-136588 A    5/1998

(Continued)

OTHER PUBLICATIONS

International Search Report for PCT/JP2013/068436 dated Sep. 10, 2013.

(Continued)

*Primary Examiner* — Rexford Barnie
*Assistant Examiner* — Xuan Ly
(74) *Attorney, Agent, or Firm* — Sughrue Mion, PLLC

(57) ABSTRACT

A power-receiving device includes a secondary-side coil which can receive a first alternating current power without contact from a power-sending device having a primary side coil into which first alternating current power is input. The power-receiving device comprises a first power transmission path, a second power transmission path, a common path positioned in common with the first and second power transmission paths, and a voltage regulator arranged on the common path. The voltage regulator rectifies the first alternating current power received by the secondary coil or the (Continued)

second alternating current power from a connecting portion, converts the rectified power to a predetermined specific voltage value, and outputs the power.

7 Claims, 3 Drawing Sheets

(51) Int. Cl.
- *H02J 5/00* (2016.01)
- *H02J 7/02* (2016.01)
- *H02M 1/42* (2007.01)

(52) U.S. Cl.
CPC .......... *B60L 11/1861* (2013.01); *H02J 7/025* (2013.01); *H02J 17/00* (2013.01); *H02M 1/4225* (2013.01); *B60L 2210/10* (2013.01); *B60L 2210/30* (2013.01); *B60L 2210/40* (2013.01); *B60L 2240/547* (2013.01); *B60L 2240/549* (2013.01); *Y02T 10/7005* (2013.01); *Y02T 10/705* (2013.01); *Y02T 10/7044* (2013.01); *Y02T 10/7072* (2013.01); *Y02T 10/7216* (2013.01); *Y02T 10/7241* (2013.01); *Y02T 90/122* (2013.01); *Y02T 90/127* (2013.01); *Y02T 90/14* (2013.01)

(56) References Cited

U.S. PATENT DOCUMENTS

| | | | |
|---|---|---|---|
| 2012/0153717 A1* | 6/2012 | Obayashi | ............ B60L 11/1816 307/9.1 |
| 2013/0300364 A1 | 11/2013 | Baier et al. | |

FOREIGN PATENT DOCUMENTS

| | | | |
|---|---|---|---|
| JP | 2004-7880 A | 1/2004 |
| JP | 2006-230057 A | 8/2006 |
| JP | 2007-336710 A | 12/2007 |
| JP | 2009-106136 A | 5/2009 |
| JP | 2011-015548 A | 1/2011 |

OTHER PUBLICATIONS

Communication dated Jul. 14, 2015 from the Japanese Patent Office in counterpart application No. 2012-155643.

Communication dated Jan. 13, 2015, issued by the International Searching Authority in corresponding application No. PCT/JP2013/068436.

Communication dated Feb. 25, 2016, from the European Patent Office in counterpart European Application No. 13816038.7.

* cited by examiner

POWER-RECEIVING DEVICE AND POWER TRANSMISSION SYSTEM

CROSS REFERENCE TO RELATED APPLICATIONS

This application is a National Stage of International Application No. PCT/JP2013/068436 filed Jul. 4, 2013, claiming priority based on Japanese Patent Application No. 2012-155643, filed Jul. 11, 2012, the contents of all of which are incorporated herein by reference in their entirety.

FIELD OF INVENTION

The present invention relates to a power-receiving device and a power transmission system.

BACKGROUND OF THE INVENTION

Conventionally, power transmission systems include contact type systems that transmit power using wires such as power codes and electric power cables and contactless type systems without such wires. As an example of the contactless type power transmission systems, a system using magnetic field resonance is known. For example, a contactless type power transmission system described in Patent Document 1 includes a power-sending device including a primary-side resonance coil and a power-receiving device having a secondary-side resonance coil. The primary-side resonance coil receives alternating current power from an alternating current power supply. Magnetic field resonance occurs between the primary-side resonance coil and the secondary-side resonance coil. Through such magnetic field resonance between the primary-side resonance coil and the secondary-side resonance coil, the alternating current power is transmitted from the power-sending device to the power-receiving device.

PRIOR ART DOCUMENTS

Patent Documents

Patent Document 1: Japanese Laid-Open Patent Publication No. 2009-106136

SUMMARY OF THE INVENTION

To improve the convenience, a power-receiving device or a power transmission system adapted for both contact type power transmission and contactless type power transmission may be provided. In this case, a complicated configuration would be needed for adaption for both types of power transmission.

Accordingly, it is an objective of the present invention to provide a power-receiving device that is configured comparatively simple and adapted for both contact type power transmission and contactless type power transmission in a desired manner and a power transmission system having the power-receiving device.

To achieve the foregoing objective and in accordance with a first aspect of the present invention, a power-receiving device is provided that includes a secondary-side coil capable of receiving first alternating current power in a contactless manner from a power-sending device having a primary-side coil to which the first alternating current power is input, a connecting portion to which a cable used to transmit second alternating current power is connected, a load, a first power transmission path that connects the secondary-side coil and the load to each other, a second power transmission path that connects the connecting portion and the load to each other, a common path provided in common in the first and second power transmission paths, and a voltage regulator arranged on the common path. The voltage regulator rectifies the first alternating current power received by the secondary-side coil or the second alternating current power provided from the connecting portion, and wherein the voltage regulator converts the rectified power into a predetermined specific voltage value and outputs the power.

In accordance with a second aspect of the present invention a power transmission system is provided that includes a power-sending device and a power-receiving device of the above first aspect. The power-sending device has a primary-side coil to which the first alternating current power is input.

In the above-described configuration, when the power-receiving device receives the first alternating current power or the second alternating current power, the voltage regulator, which is arranged on the common path, rectifies and converts the alternating current power into direct current power having the specific voltage value, and then outputs the direct current power. In this manner, regardless of whether the first or second alternating current power is received, stable direct current power is supplied to the load. Also, the configuration is simplified compared to a configuration having separate voltage regulators provided in the respective power transmission paths. As a result, the present invention is configured comparatively simple and adapted for both contact type power transmission and contactless type power transmission in a desired manner.

DETAILED DESCRIPTION OF THE PREFERRED EMBODIMENTS

Figure 2:
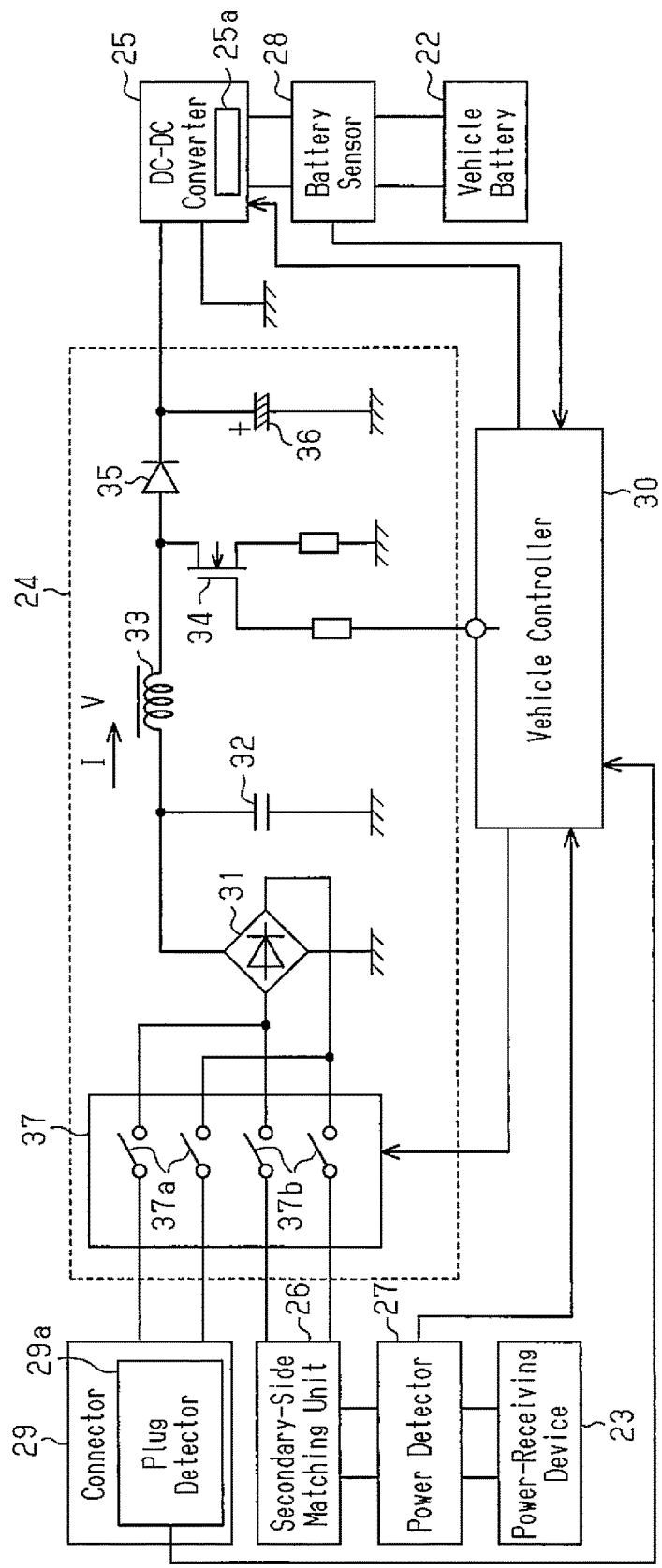
FIG. 2 is a circuit diagram representing a boost rectifier circuit.
Figure 3:
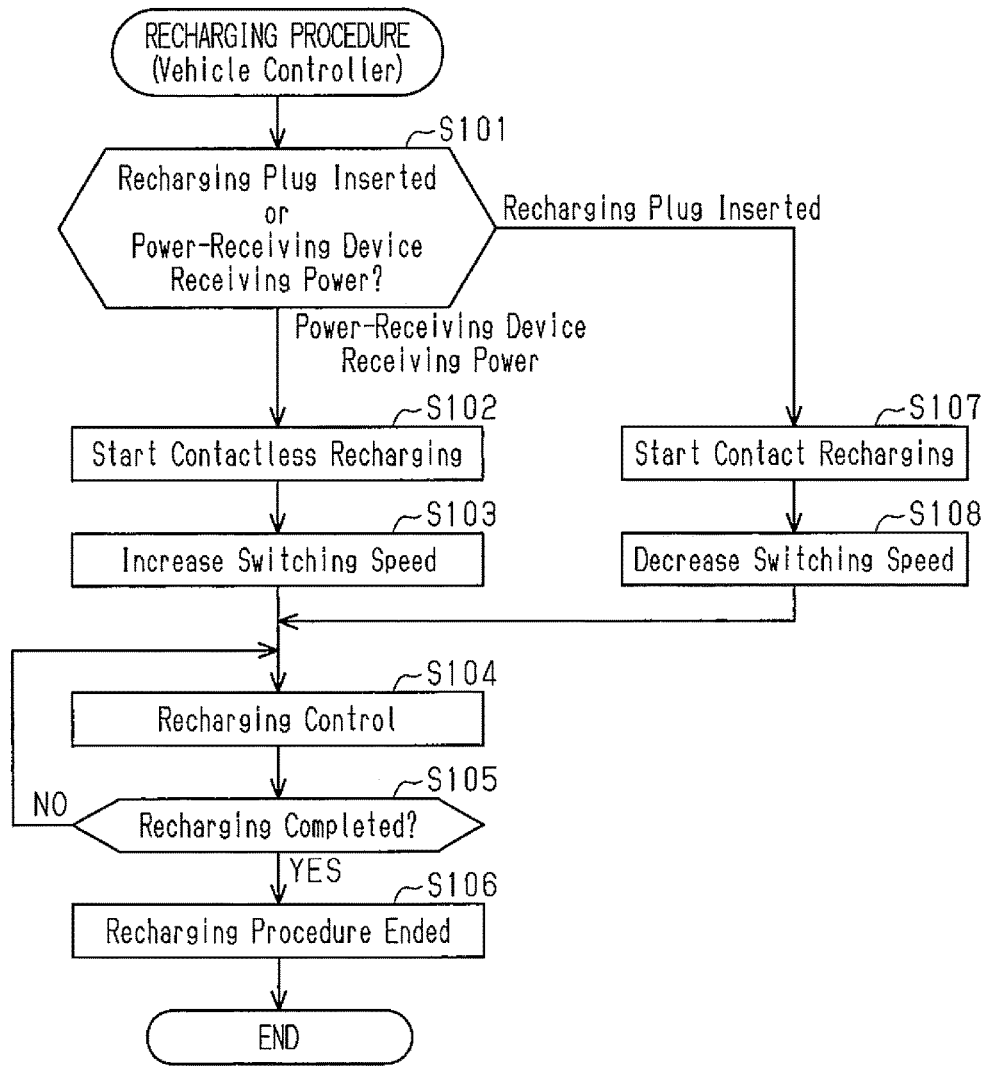
FIG. 3 is a flowchart representing a recharging procedure.

A power transmission system according to the present invention will now be described with reference to FIGS. 1 to 3.

Figure 1:
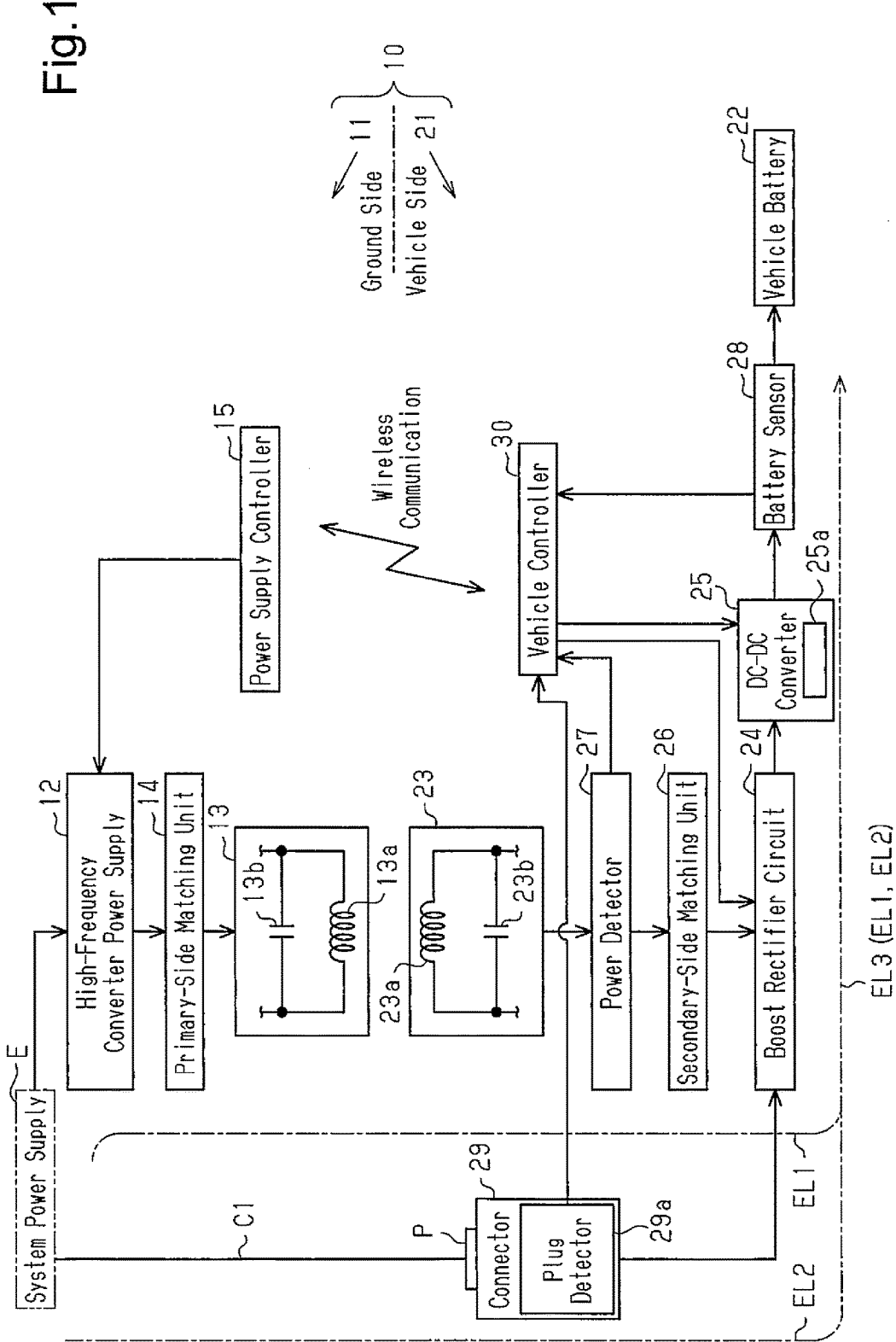
FIG. 1 is a block diagram representing a power transmission system according to the present invention.

As illustrated in FIG. 1, a power transmission system 10 includes a ground device 11 installed on the ground and a vehicle device 21 mounted in a vehicle. The ground device 11 corresponds to a power-sending device, which is a primary-side device. The vehicle device 21 corresponds to a power-receiving device, which is a secondary-side device.

The power transmission system 10 has a contactless type first power transmission path EL1 and a contact type second power transmission path EL2. The first power transmission path EL1 transmits power from the ground device 11 to the vehicle device 21 without a cable. The second power transmission path EL2 transmits power from a system power supply E to the vehicle device 21 using a cable C1.

The configuration of the first power transmission path EL1 will hereafter be described. The ground device 11 includes a high-frequency converter power supply 12 (an alternating current power supply), which is arranged in the first power transmission path EL1 and outputs high-frequency power (alternating current power) having a predetermined frequency. The high-frequency converter power supply 12 is adapted for output of the high-frequency power using alternating current power supplied from the system electric supply E. Specifically, the high-frequency converter power supply 12 includes a switching element (which is, for example, a power MOSFET or an insulated gate bipolar transistor (IGBT)). The high-frequency converter power supply 12 is a switching power supply that obtains the high-frequency power having the predetermined frequency through switching of the switching element.

For purposes of illustration, alternating current power of 50 Hz or 60 Hz output from the system power supply E is referred to simply as low-frequency power. The high-frequency power and the low-frequency power are both referred to generally as alternating current power. The low-frequency power supplied from the system power supply E corresponds to a "second alternating current power" and the high-frequency power supplied from the high-frequency converter power supply 12 corresponds to a "first alternating current power".

The high-frequency power output from the high-frequency converter power supply 12 is transmitted to the vehicle device 21 via the first power transmission path EL1 and consumed to recharge a vehicle battery 22, which is arranged in the vehicle device 21. Specifically, the power transmission system 10 includes a power-sending device 13 (a primary-side resonance circuit) provided in the ground device 11 and a power-receiving device 23 (a secondary-side resonance circuit) arranged in the vehicle device 21.

The power-sending device 13 and the power-receiving device 23 are configured identically and adapted to cause magnetic field resonance. Specifically, the power-sending device 13 is configured by a resonance circuit including a primary-side coil 13a and a primary-side capacitor 13b, which are connected in parallel. The power-receiving device 23 is configured by a resonance circuit including a secondary-side coil 23a and a secondary-side capacitor 23b, which are connected in parallel. The resonance frequency of the power-sending device 13 and the resonance frequency of the power-receiving device 23 are set equal.

In this configuration, when the high-frequency power is input from the high-frequency converter power supply 12 to the power-sending device 13 (the primary-side coil 13a), magnetic field resonance is brought about between the power-sending device 13 (the primary-side coil 13a) and the power-receiving device 23 (the secondary-side coil 23a). This causes the power-receiving device 23 to receive some of the energy generated by the power-sending device 13. In other words, the power-receiving device 23 receives the high-frequency power from the power-sending device 13 in a contactless manner.

The vehicle device 21 has a boost rectifier circuit 24 (a voltage regulator) and a DC-DC converter 25. The boost rectifier circuit 24 rectifies the high-frequency power received by the power-receiving device 23 and outputs direct current power having a predetermined voltage value. The DC-DC converter 25 is arranged between the boost rectifier circuit 24 and the vehicle battery 22 and receives the direct current power from the boost rectifier circuit 24. The direct current power is then input from the DC-DC converter 25 to the vehicle battery 22.

A primary-side matching unit 14 and a secondary-side matching unit 26, which perform impedance conversion or impedance matching, are arranged in the first power transmission path EL1. Specifically, the primary-side matching unit 14 is arranged between the high-frequency converter power supply 12 and the power-sending device 13 in the ground device 11. The secondary-side matching unit 26 is provided between the power-receiving device 23 and the boost rectifier circuit 24. The matching units 14, 26 each have a predetermined constant.

A power detector 27, which detects the high-frequency power received by the power-receiving device 23, is arranged between the power-receiving device 23 and the secondary-side matching unit 26 in the first power transmission path EL1. Accordingly, based on a detection result of the power detector 27, a determination whether the power-receiving device 23 currently receives the high-frequency power is made.

A battery sensor 28, which detects the charge amount of the vehicle battery 22, is provided between the DC-DC converter 25 and the vehicle battery 22. Accordingly, based on a detection result of the battery sensor 28, the charge amount of the vehicle battery 22 is determined.

As has been described, the high-frequency power output from the high-frequency converter power supply 12 is transmitted via the power-sending device 13 and the power-receiving device 23, which are arranged in the first power transmission path EL1, rectified by the boost rectifier circuit 24, and input to the vehicle battery 22. In this manner, the vehicle battery 22 is recharged. In other words, the first power transmission path EL1 is a path for transmitting power from the system power supply E to the high-frequency converter power supply 12, the primary-side matching unit 14, the power-sending device 13, the power-receiving device 23, the power detector 27, the secondary-side matching unit 26, the boost rectifier circuit, the DC-DC converter 25, the battery sensor 28, and the vehicle battery 22 sequentially in this order.

Specifically, in the present embodiment, the boost rectifier circuit 24 corresponds to "the voltage regulator" and the DC-DC converter 25 is described as a separate body from "the voltage regulator".

The configuration related to the second power transmission path EL2 will hereafter be described.

The power transmission system 10 includes the cable C1, which is used to transmit the low-frequency power, as a component of the second power transmission path EL2. One end of the cable C1 is connected to the system power supply E. The opposite end of the cable C1 has an insertable recharging plug P.

The vehicle device 21 includes a connector 29, which is arranged in correspondence with the recharging plug P and serves as a connecting portion into which the recharging plug P is inserted. Through connection between the recharging plug P and the connector 29, the system power supply E and the vehicle device 21 are electrically connected to each other.

The connector 29 is connected to the boost rectifier circuit 24. The low-frequency power transmitted through the connector 29 is thus rectified and input to the vehicle battery 22. This recharges the vehicle battery 22. In other words, the second power transmission path EL2 is a path that transmits power from the system power supply E to the cable C1, the connector 29, the boost rectifier circuit 24, the DC-DC converter 25, the battery sensor 28, and the vehicle battery 22 sequentially in this order.

The power transmission paths EL1, EL2 are provided separately from the system power supply E to the boost rectifier circuit 24 and are common from the boost rectifier circuit 24 to the vehicle battery 22. That is, the path from the boost rectifier circuit 24 to the vehicle battery 22 forms a part of each power transmission path EL1, EL2 and is a common path EL3, which is arranged in common in the power transmission paths EL1, EL2. In other words, the boost rectifier circuit 24, the DC-DC converter 25, and the battery sensor 28 are arranged on the common path EL3.

A power supply controller 15 serving as a control section for controlling the high-frequency converter power supply 12 is provided in the ground device 11. A vehicle controller 30 serving as a control section capable of wirelessly communicating with the power supply controller 15 is arranged in the vehicle device 21. The power transmission system 10 performs various types of controls such as starting or ending of power transmission, which is recharging, through communication between the controllers 15, 30.

The connector 29 includes a plug detector 29a, which detects whether the connector 29 is connected to the cable C1, or, specifically, the recharging plug P is inserted. The plug detector 29a and the power detector 27 each transmit a detection result to the vehicle controller 30. Based on the detection results of the plug detector 29a and the power detector 27, the vehicle controller 30 determines whether the high-frequency power or the low-frequency power is currently received.

The battery sensor 28 also transmits a detection result to the vehicle controller 30. Based on the detection result of the battery sensor 28, the vehicle controller 30 determines the charge amount of the vehicle battery 22.

The DC-DC converter 25 includes a switching element 25a, which performs switching periodically. The vehicle controller 30 regulates the ON/OFF duty cycle of the switching element 25a of the DC-DC converter 25 to control the current supplied to the vehicle battery 22 to be constant.

The boost rectifier circuit 24 will hereafter be described with reference to FIG. 2.

As has been described, the boost rectifier circuit 24 rectifies input alternating current power and outputs direct current power. Specifically, with reference to FIG. 2, the boost rectifier circuit 24 has a diode bridge 31 for full-wave rectification and a smoothing capacitor 32 for removal of a ripple current each as a component for rectifying the high-frequency power and the low-frequency power. The boost rectifier circuit 24 includes a choke coil 33, which receives pulsating current power that has been subjected to the full-wave rectification by the diode bridge 31, and a switching element 34, which is connected in parallel to the choke coil 33. The switching element 34 is, for example, an n-type power MOSFET. The switching element 34 includes a gate connected to the vehicle controller 30, a drain connected to the choke coil 33, and a grounded source. The gate of the switching element 34 receives a pulse signal from the vehicle controller 30. The boost rectifier circuit 24 also includes a diode 35 for rectifying and, at the same time, restraining reverse flow and a smoothing capacitor 36, which is connected in parallel to the choke coil 33. The diode 35 is connected in series to the choke coil 33. Specifically, the diode 35 has an anode connected to the choke coil 33 and the drain of the switching element 34 and a cathode connected to the DC-DC converter 25 via an output end of the boost rectifier circuit 24. The smoothing capacitor 36 has an end connected to the cathode of the diode 35 and an opposite grounded end.

In this configuration, when the vehicle controller 30 inputs a pulse signal with a predetermined period to the gate, the switching element 34 performs switching (ON/OFF operation) with the predetermined period. In this case, the current flowing in the choke coil 33 (hereinafter, referred to as an "inductor current I") corresponds to the ON/OFF duty cycle of the switching element 34. The aforementioned pulsating current power is smoothed by the diode 35 and the smoothing capacitor 36 and thus converted into direct current power. The direct current power is then output from the boost rectifier circuit 24. The voltage of the direct current power output from the boost rectifier circuit 24 is dependent on the ON/OFF duty cycle of the switching element 34.

The vehicle controller 30 controls the ON/OFF duty cycle of the switching element 34 to operate the boost rectifier circuit 24 to output direct current power with a voltage value that activates the DC-DC converter 25. In the present embodiment, the vehicle controller 30 controls the ON/OFF duty cycle of the switching element 34 such that the voltage value of the direct current power output from the boost rectifier circuit 24 becomes a value (hereinafter, referred to as a specific voltage value) determined with balance between power factor and loss in the DC-DC converter 25 taken into consideration in the withstand voltage range of the components of the DC-DC converter 25. Specifically, the loss in the DC-DC converter 25 decreases as the voltage value of the input direct current power increases. On the other hand, the power factor improves as the phase of the envelope of the inductor current I and the phase of the envelope of the applied voltage V of the choke coil 33 approach each other. Accordingly, in the present embodiment, the vehicle controller 30 controls the ON/OFF duty cycle of the switching element 34 such that the voltage of the direct current power output from the boost rectifier circuit 24 becomes a value determined with the balance between the power factor and the loss in the DC-DC converter 25 taken into consideration.

The specific voltage value is higher than the voltage value of the vehicle battery 22. The specific voltage value is set to such a value that the power factor approach "1" and the loss in the DC-DC converter 25 decreases, for example. The loss in the DC-DC converter 25 includes, for example, switching loss of the switching element 25a of the DC-DC converter 25. If the voltage value of the high-frequency power and the voltage value of the low-frequency power are different from each other, the specific voltage value corresponding to the high-frequency power and the specific voltage value corresponding to the low-frequency power may be different from each other.

As will be described in detail later, the gate of the switching element 34 is adapted for reception of a pulse signal with a period shorter than the period of the alternating current power input to the boost rectifier circuit 24. This ensures that switching of the switching element 34 corresponds to the alternating current power input to the boost rectifier circuit 24.

The boost rectifier circuit 24 includes a switch set 37, which switches the alternating current power input to the diode bridge 31 to the high-frequency power or the low-frequency power. The switch set 37 includes a first switch 37a for switching the connector 29 and the diode bridge 31 between a connected state and a disconnected state and a second switch 37b for switching the power-receiving device 23 (which is, specifically, the secondary-side matching unit 26) and the diode bridge 31 between a connected state and a disconnected state. The vehicle controller 30 carries out ON/OFF control of the switch set 37 to switch the connection target of the diode bridge 31 between the connector 29 and the power-receiving device 23.

When the vehicle controller 30 receives power either in a contact manner or a contactless manner, or, specifically, when the plug detector 29a detects that the recharging plug P has been inserted or the power detector 27 detects reception of the high-frequency power, the vehicle controller 30 executes a recharging procedure for recharging the vehicle battery 22. The recharging procedure will hereafter be described with reference to the flowchart of FIG. 3.

First, in Step S101, the vehicle controller 30 determines whether recharging will be performed in a contact manner or a contactless manner. Specifically, the vehicle controller 30 determines whether the recharging plug P has been inserted or the power-receiving device 23 currently receives the high-frequency power based on the detection results of the plug detector 29a and the power detector 27.

If the power-receiving device 23 is receiving the high-frequency power, the vehicle controller 30 carries out Step S102 and starts contactless type recharging. Specifically, the vehicle controller 30 controls the switch set 37 to connect the power-receiving device 23 and the diode bridge 31 to each other. The vehicle controller 30 thus performs various types of initial settings for starting the contactless type recharging.

Subsequently, in Step S103, the vehicle controller 30 sets the ON/OFF duty cycle of the switching element 34. Specifically, the vehicle controller 30 increases the speed of switching in correspondence with the frequency of the high-frequency power. The vehicle controller 30 sets the switching frequency to, for example, a value ten times as high as the frequency of the high-frequency power. In other words, the vehicle controller 30 sets the switching period to a tenth of the period of the high-frequency power.

Then, the vehicle controller 30 performs recharging control in Step S104. Specifically, the vehicle controller 30 regulates the ON/OFF duty cycle of the switching element 34 such that the voltage value of the direct current power output from the boost rectifier circuit 24 becomes equal to the specific voltage value.

The vehicle controller 30 also controls the current flowing in the vehicle battery 22 to be constant by regulating the ON/OFF duty cycle of the switching element 25a of the DC-DC converter 25.

Subsequently, in Step S105, the vehicle controller 30 determines whether recharging of the vehicle battery 22 has been completed, or ended, based on a detection result of the battery sensor 28. Specifically, the vehicle controller 30 determines whether the charge amount of the vehicle battery 22 is greater than or equal to a predetermined recharging completing amount.

If the charge amount of the vehicle battery 22 is less than the recharging completing amount, the vehicle controller 30 determines that recharging has not yet been completed and repeats Step S104. In other words, the vehicle controller 30 repeatedly performs the procedure of Step S104 until recharging is completed. In contrast, if the vehicle controller 30 determines that recharging has been completed, the vehicle controller 30 carries out a recharging ending procedure in Step S106 and ends the recharging procedure. In the recharging ending procedure, if the contactless type recharging is currently performed, the vehicle controller 30 transmits a recharging ending signal to the power supply controller 15. In response to the power-receiving ending signal, the power supply controller 15 controls the high-frequency converter power supply 12 to stop output of the high-frequency power. In contrast, if the contact type recharging is currently performed, the power supply controller 15 executes a procedure for ending power supply from the system power supply E. Although the procedure may be constituted in any suitable manner, a relay may be arranged in the second power transmission path EL2, for example, and be switched.

In contrast, if a determination that the recharging plug P has been inserted is made in Step S101, the vehicle controller 30 starts contact type recharging in Step S107. Specifically, the vehicle controller 30 controls the switch set 37 to connect the connector 29 and the diode bridge 31 to each other. The vehicle controller 30 then carries out various types of initial settings for starting the contact type recharging.

Subsequently, the vehicle controller 30 sets the ON/OFF duty cycle of the switching element 34 in Step S108. Specifically, the vehicle controller 30 decreases the speed of switching in correspondence with the frequency of the low-frequency power. The vehicle controller 30 sets the switching frequency to, for example, a value ten times as high as the frequency of the low-frequency power. In other words, the vehicle controller 30 sets the switching period to a tenth of the period of the low-frequency power. In this case, since the frequency of the low-frequency power is lower than the frequency of the high-frequency power, the frequency set in the procedure is lower than the frequency set in the procedure of Step S103. In other words, the switching frequency at the time the high-frequency power is input is lower than the switching frequency at the time the low-frequency power is input. Afterwards, the vehicle controller 30 carries out the procedures of Steps S104 to S106 and ends the recharging procedure.

Operation of the present embodiment will now be described.

As has been described, the boost rectifier circuit 24 is arranged on the common path EL3. As a result, regardless of whether power is transmitted through the power transmission path EL1 or the power transmission path EL2, the power passes through the boost rectifier circuit 24.

Switching of the switching element 34 of the boost rectifier circuit 24 causes the inductor current I to have a continuous triangular current waveform. In this case, the amplitude of the inductor current I is determined in correspondence with the ON/OFF duty cycle of the switching element 34 and set to such a value that the voltage value output from the boost rectifier circuit 24 becomes equal to the specific voltage value. As a result, regardless of whether the high-frequency power or the low-frequency power is provided, the vehicle battery 22 is recharged in a desired manner.

The ON/OFF duty cycle of the switching element 34 is controlled such that the phase of the envelope of the inductor current I and the envelope of the applied voltage V of the choke coil 33 approach each other. This improves the power factor.

The switching frequency in a state in which the boost rectifier circuit 24 receives the low-frequency power is set lower than the switching frequency in a state in which the boost rectifier circuit 24 receives the high-frequency power. This reduces switching loss of the switching element 34 when the low-frequency power is rectified.

The present embodiment, which has been described in detail, has the advantages described below.

(1) The contactless type first power transmission path EL1 and the contact type second power transmission path EL2 are provided. Regardless of whether the high-frequency power or the low-frequency power is input to the common path EL3 of the first and second power transmission paths EL1, EL2, the boost rectifier circuit 24 outputs direct current power having the predetermined specific voltage value. As a result, contactless type power transmission and contact type power transmission are brought about through a common configuration. This simplifies the configuration.

(2) The voltage value of the direct current power output from the boost rectifier circuit 24 is set to such a value that the loss in the DC-DC converter 25 decreases. This improves the transmission efficiency, thus ensuring desired recharging of the vehicle battery 22.

(3) The switching frequency in a state in which the boost rectifier circuit 24 receives the low-frequency power is set lower than the switching frequency in a state in which the boost rectifier circuit 24 receives the high-frequency power. This decreases power loss caused by mismatching between the switching frequency and the frequency of the power input to the boost rectifier circuit 24.

Specifically, the switching frequency of the switching element 34 must be higher than the frequency of the input alternating current power so that the switching frequency corresponds to the frequency of the input alternating current power. Accordingly, for reception of the high-frequency power, switching must be performed at a frequency higher than the frequency of the high-frequency power. In contrast, if switching is carried out at the frequency higher than the frequency of the high-frequency power when the low-frequency power is received, the switching becomes excessive and increases switching loss.

However, in the present embodiment, the switching frequency of the switching element 34 in a state in which the low-frequency power is received is set relatively low. This ensures that the switching frequency corresponds to the frequency of the low-frequency power and the switching loss decreases. As a result, the aforementioned disadvantage, which may be caused by the boost rectifier circuit 24 used in common for the high-frequency power and the low-frequency power, is avoided.

(4) By regulating the ON/OFF duty cycle of the switching element 34, the phase of the envelope of the inductor current I and the phase of the envelope of the applied voltage V of the choke coil 33 are allowed to approach each other. This improves the power factor, thus further enhancing transmission efficiency.

If the boost rectifier circuit 24 and the DC-DC converter 25 are regarded as one single voltage converter, it can be said that the voltage value of the direct current power output from the boost rectifier circuit 24 (the voltage regulator) is set to such a value that the efficiency of the single voltage converter becomes relatively high.

The above embodiment may be modified as follows.

In the above illustrated embodiment, the specific voltage value is set with the balance between the power factor and the loss in the DC-DC converter 25 taken into consideration. However, for example, the specific voltage value may be set to a value at which the loss in the DC-DC converter 25 is minimized, without considering the power factor. Specifically, the maximum voltage value that can be output from the boost rectifier circuit 24 in the withstand voltage range of the components of the DC-DC converter 25 may be employed as the specific voltage value.

In contrast, for example, the voltage value at which the power factor is 1 may be employed as the specific voltage value without considering the loss in the DC-DC converter 25. However, to perform desired power transmission, a voltage value that allows the power factor to approach 1 and decreases the loss in the DC-DC converter 25 should be employed as the specific voltage value. In other words, the voltage value of the direct current voltage value output from the boost rectifier circuit 24 should be determined based on the power factor and the loss in the DC-DC converter 25. In this case, the specific voltage value may be the maximum voltage value of the boost rectifier circuit 24 in a range in which the power factor is greater than or equal to a predetermined threshold value. Alternatively, the specific voltage value may be set to increase the power factor in a range greater than or equal to a predetermined threshold value and lower than or equal to a value corresponding to the withstand voltage.

Although the boost rectifier circuit 24 has the switch set 37 in the above illustrated embodiment, the invention is not restricted to this and the switch set 37 may be omitted. However, since some of the low-frequency power supplied from the connector 29 flows back to the power-receiving device 23, it is preferable to employ the switch set 37.

The boost rectifier circuit 24 may be configured in any suitable manner as long as the boost rectifier circuit 24 operates to rectify alternating current power and output direct current power having the specific voltage value.

When the voltage of the vehicle battery 22 is lower than the voltage value of the high-frequency power and the voltage value of the low-frequency power, the voltage value of the vehicle battery 22 may be lowered instead of being raised.

The above illustrated embodiment employs different switching frequencies of the switching element 34 for a case of receiving the high-frequency power and a case of receiving the low-frequency power. The invention is not restricted to this and the switching frequency of the switching element 34 may be maintained constant. In this case, the switching frequency should be set higher than the frequency of the high-frequency power so that the switching frequency corresponds to the high-frequency power.

Although the matching units 14, 26 have the fixed constants in the above illustrated embodiment, the invention is not restricted to this and variable constants may be employed. Further, the units 14, 26 may be omitted.

In the above illustrated embodiment, switching of the switching element 34 is controlled mainly by the vehicle controller 30. However, the invention is not restricted to this and an additional controller may be provided independently from the vehicle controller 30, for example. Alternatively, the power supply controller 15 may control switching of the switching element 34.

The high-frequency converter power supply 12 may output high-frequency powers of different power values (voltage values). Also in this case, the ON/OFF duty cycle of the switching element 34 should be controlled to output the direct current power with the specific voltage. Further, the case is adapted for impedance variation of the vehicle battery 22 caused by change of the power value of the power output from the high-frequency converter power supply 12. However, the ON/OFF duty cycle of the switching element 25a of the DC-DC converter 25 should be regulated such that impedance from the input end of the DC-DC converter 25 to the vehicle battery 22 becomes constant.

In the above illustrated embodiment, it is determined that the high-frequency power or the low-frequency power is currently received based on detection results of the plug detector 29a and the power detector 27. The present invention is not restricted to this and may be configured in any suitable manner to make the aforementioned determination. For example, the invention may be configured to allow the power supply controller 15 to wirelessly transmit information representing the currently employed recharging method to the vehicle controller 30.

Although the vehicle device 21 includes the DC-DC converter 25 in the above illustrated embodiment, the DC-DC converter 25 may be omitted.

In the above illustrated embodiment, power transmission is carried out in one direction from the system power supply E to the vehicle battery 22. The invention is not restricted to this and may be a bidirectional power transmission system that causes the vehicle battery 22 to discharge and thus transmits the power from the vehicle battery 22 to the ground device 11, the system power supply E, or any other suitable power storage device (for example, a household power storage device).

The voltage of the high-frequency power output from the high-frequency converter power supply 12 may have any suitable waveform such as a pulse waveform or a sine waveform.

Although the above illustrated embodiment includes the high-frequency converter power supply 12, which outputs the high-frequency power, the invention is not restricted to this. That is, any suitable power supply may be employed as long as the power supply is an alternating current converter power supply that outputs alternating current power with a predetermined frequency (for example, 10 kHz to 10 MHz). The frequency of the output alternating current power is set in any suitable manner in correspondence with a resonance frequency or the like. Alternatively, the high-frequency converter power supply 12 may be omitted.

Although the above illustrated embodiment includes the capacitors 13b, 23b, the capacitors 13b, 23b may be omitted. In this case, magnetic field resonance is brought about using parasitic capacitance of each of the coils 13a, 23a.

In the above illustrated embodiment, the resonance frequency of the power-sending device 13 and the resonance frequency of the power-receiving device 23 are equal. However, the present invention is not restricted to this and the resonance frequency of the power-sending device 13 and the resonance frequency of the power-receiving device 23 may be different from each other in such a range in which power transmission is allowed to occur.

Although the power-sending device 13 and the power-receiving device 23 are configured identically with each other, the present invention is not restricted to this. The power-sending device 13 and the power-receiving device 23 may be configured differently from each other.

Although magnetic field resonance is used to ensure contactless type power transmission in the above illustrated embodiment, the present invention is not restricted to this and may employ electromagnetic induction.

The power-sending device 13 may include a primary-side coupling coil, which is coupled with a resonance circuit configured by the primary-side coil 13a and the primary-side capacitor 13b through electromagnetic induction. In this case, the primary-side coupling coil and the high-frequency converter power supply 12 are connected to each other. The resonance circuit receives high-frequency power from the primary-side coupling coil through electromagnetic induction. Similarly, the power-receiving device 23 may include a secondary-side coupling coil, which is coupled with a resonance circuit configured by the secondary-side coil 23a and the secondary-side capacitor 23b through electromagnetic induction. Using the secondary-side coupling coil, power is obtained from the resonance circuit of the power-receiving device 23.

The high-frequency converter power supply 12 may be either a voltage source or a current source.

Although the power transmission system 10 is used in a vehicle in the above illustrated embodiment, the present invention is not restricted to this and may be employed in any other suitable device. The power transmission system 10 may be used to recharge a battery of a cellular phone, for example.

In the above illustrated embodiment, the low-frequency power with a comparatively low frequency is transmitted in a contact manner and the high-frequency power with a comparatively high frequency is transmitted in a contactless manner. The present invention is not restricted to this. That is, the high-frequency power may be transmitted in a contact manner, and the low-frequency power may be transmitted in a contactless manner.

If the voltage value of the alternating current power input to the boost rectifier circuit 24 in the contactless manner is different from the voltage value of the alternating current power input to the boost rectifier circuit 24 in the contact manner, the ON/OFF duty cycle of the switching element 34 may be regulated to output direct current power with a constant voltage value. However, if the voltage value of the direct current power output from the boost rectifier circuit 24 is set to such a value that the power factor improves and the loss in the DC-DC converter 25 decreases when alternating current power is input in the contactless manner, the power factor may not improve if the alternating current power is input in the contact manner.

The invention claimed is:

1. A power-receiving device comprising:
a secondary-side coil capable of receiving first alternating current power in a contactless manner from a power-sending device having a primary-side coil to which the first alternating current power is input;
a connecting portion to which a cable used to transmit second alternating current power is connected;
a load;
a first power transmission path that connects the secondary-side coil and the load to each other;
a second power transmission path that connects the connecting portion and the load to each other;
a common path provided in common in the first and second power transmission paths; and
a voltage regulator arranged on the common path, wherein the voltage regulator rectifies the first alternating current power received by the secondary-side coil or the second alternating current power provided from the connecting portion, and wherein the voltage regulator converts the rectified power into a predetermined specific voltage value and outputs the power, wherein the voltage regulator includes a switching element, the voltage regulator rectifies the first alternating current power or the second alternating current power into the predetermined specific voltage value and outputs the power due to that the switching element switches periodically,
the power-receiving device includes a control section that controls the switching element to change a switching frequency of the switching element,
a frequency of the second alternating current power is lower than a frequency of the first alternating current power, and
the control section controls the switching element such that the switching frequency of the switching element in a state in which the voltage regulator is receiving the second alternating current power is lower than the switching frequency of the switching element in a state in which the voltage regulator is receiving the first alternating current power.

2. The device according to claim 1, wherein the control section controls the voltage regulator such that the voltage regulator converts the voltage value of the first alternating current power or the voltage value of the second alternating current power into the specific voltage value by regulating an ON/OFF duty cycle of the switching element.

3. The power-receiving device according to claim 2, wherein
the load includes a battery, and
the specific voltage value is higher than a voltage value of the battery.

4. The device according to claim 2, wherein the specific voltage value is set to increase a power factor.

5. The device according to claim 2, further comprising a DC-DC converter arranged between the voltage regulator and the load, wherein the specific voltage value is set to decrease loss in the DC-DC converter.

6. The device according to claim 1, further comprising a DC-DC converter that is arranged between the voltage regulator and the load and includes a switching element, wherein an ON-OFF duty cycle of the switching element of the DC-DC converter is regulated to regulate a current value input to the load.

7. A power transmission system comprising:
a power-sending device; and
a power-receiving device for receiving first alternating current power from the power-sending device in a contactless manner, wherein
the power-sending device has a primary-side coil to which the first alternating current power is input, and
the power-receiving device includes:
a secondary-side coil capable of receiving the first alternating current power from the power-sending device in the contactless manner;
a connecting portion to which a cable used to transmit second alternating current power is connected;
a load;
a first power transmission path that connects the secondary-side coil and the load to each other;
a second power transmission path that connects the connecting portion and the load to each other;
a common path provided in common in the first and second power transmission paths; and
a voltage regulator arranged on the common path, wherein the voltage regulator rectifies the first alternating current power received by the secondary-side coil or the second alternating current power provided from the connecting portion, and wherein the voltage regulator converts the rectified power into a predetermined specific voltage value and outputs the power, wherein
the voltage regulator includes a switching element, the voltage regulator rectifies the first alternating current power or the second alternating current power into the predetermined specific voltage value and outputs the power due to that the switching element switches periodically,
the power-receiving device includes a control section that controls the switching element alternating current power, and
the control section controls the switching element such that the switching frequency of the switching element in a state in which the voltage regulator is receiving the second alternating current power is lower than the switching frequency of the switching element in a state in which the voltage regulator is receiving the first alternating current power.

\* \* \* \* \*